United States Patent
Jiang et al.

(10) Patent No.: US 11,190,439 B2
(45) Date of Patent: Nov. 30, 2021

(54) DATA STREAM TRANSMISSION

(71) Applicant: New H3C Technologies Co., Ltd., Hangzhou (CN)

(72) Inventors: Wendong Jiang, Beijing (CN); Zhigang Fu, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 24 days.

(21) Appl. No.: 16/633,084

(22) PCT Filed: Jul. 24, 2018

(86) PCT No.: PCT/CN2018/096880
§ 371 (c)(1),
(2) Date: Jan. 22, 2020

(87) PCT Pub. No.: WO2019/020032
PCT Pub. Date: Jan. 31, 2019

(65) Prior Publication Data
US 2020/0162367 A1 May 21, 2020

(30) Foreign Application Priority Data
Jul. 25, 2017 (CN) .......................... 201710610243.0

(51) Int. Cl.
*H04L 12/707* (2013.01)
*H04L 12/751* (2013.01)
(Continued)

(52) U.S. Cl.
CPC .............. *H04L 45/24* (2013.01); *H04L 45/02* (2013.01); *H04L 45/20* (2013.01); *H04L 45/74* (2013.01)

(58) Field of Classification Search
CPC combination set(s) only.
See application file for complete search history.

(56) References Cited

U.S. PATENT DOCUMENTS

| 2014/0050223 A1* | 2/2014 | Foo | H04L 45/74 370/400 |
| 2016/0099890 A1* | 4/2016 | Kaufman | H04L 45/38 709/203 |

(Continued)

FOREIGN PATENT DOCUMENTS

| CN | 1921324 | 2/2007 |
| CN | 104184663 | 12/2014 |

(Continued)

OTHER PUBLICATIONS

Extended European Search Report issued in Corresponding European Patent Application No. 18838920.9, dated May 12, 2020.
(Continued)

*Primary Examiner* — Xavier S Wong
(74) *Attorney, Agent, or Firm* — Norton Rose Fulbright US LLP

(57) ABSTRACT

A Software Defined Network (SDN) controller determines a plurality of paths for transmitting a data stream from a first network device to a second network device. The SDN controller assigns to each of the plurality of paths a path identifier, where the path identifier is uniquely corresponding to the path and the specified service. The SDN controller delivers forwarding information to a network device other than the second network device on the path. The forwarding information is configured to instruct forwarding a data stream carrying the path identifier of the path to a next hop on the path of a network device receiving the forwarding information. The SDN controller selects a path from the plurality of paths and transmits a path identifier of the selected path to the first network device. The first network device adds the path identifier of the selected path to the data stream of the specified service.

15 Claims, 4 Drawing Sheets

(51) Int. Cl.
    *H04L 12/733*     (2013.01)
    *H04L 12/741*     (2013.01)

(56) References Cited

U.S. PATENT DOCUMENTS

| | | | |
|---|---|---|---|
| 2016/0254984 A1* | 9/2016 | Tekalp | H04L 45/02 709/242 |
| 2017/0104668 A1 | 4/2017 | Zhang et al. | |
| 2017/0346716 A1* | 11/2017 | Zheng | H04L 45/64 |

FOREIGN PATENT DOCUMENTS

| | | |
|---|---|---|
| CN | 105656744 | 6/2016 |
| CN | 105791169 | 7/2016 |
| CN | 106130766 | 11/2016 |
| CN | 106130767 | 11/2016 |
| JP | 2015526921 | 9/2015 |
| JP | 2017098593 | 6/2017 |

OTHER PUBLICATIONS

Heorhiadi et al., "Accelerating the Development of Software-Defined Network Optimization Applications Using SOL" *Olin Library Cornell University*, 2015. 14 pages, arxiv.org, XP081336374. Accessed Apr. 29, 2015.

Jinyao et al., "HiQoS: An SDN-based multipath QoS solution" *China Communications*, vol. 12, No. 5, May 1, 2015, pp. 123-133. China Institute of Communications, DOI: 10.1109/CC.2015.7112035. Accessed May 21, 2015.

International Search Report and Written Opinion issued in corresponding PCT Application No. PCT/CN2018/096880, dated Oct. 24, 2018 (English translation of International Search Report provided).

Ehara et al., "Implementation of diffserv linked routing engine" *Diffserv* 2002, 79-83 (English Abstract).

Office Action issued in Corresponding Japanese Application No. 2020-503012, dated Mar. 2, 2021 (English Translation provided).

\* cited by examiner

DATA STREAM TRANSMISSION

CROSS-REFERENCE TO RELATED APPLICATION

The present application is based upon and claims the benefit of a priority of Chinese Patent Application No. 201710610243.0, filed on Jul. 25, 2017, the entire contents of which are incorporated herein by reference.

BACKGROUND

A Software Defined Network (SDN) controller usually performs data stream transmission based on Multi-Protocol Label Switching (MPLS). At present, most basic networks applied for data stream transmission are IP networks. In order to meet the demand of data stream transmission service, SDN controllers also provide data stream transmission based on an IP network.

During the process of data stream transmission based on an IP network, the SDN controller may deliver a route to each network device on the path through which the data stream passes. The route indicates the egress or the next hop, which is used to implement one-hop transmission of the data stream. Once the path through which the data stream transmission passes changes, the SDN controller may reselect a new path and deliver a route to each network device on the selected new path, which will result in an excessively long period of time for path adjustment.

DETAILED DESCRIPTION

The present disclosure is described in detail with reference to the attached drawings and specific embodiments so as to make the objective, the technical solution, and the advantage of the present disclosure clear.

Figure 1:
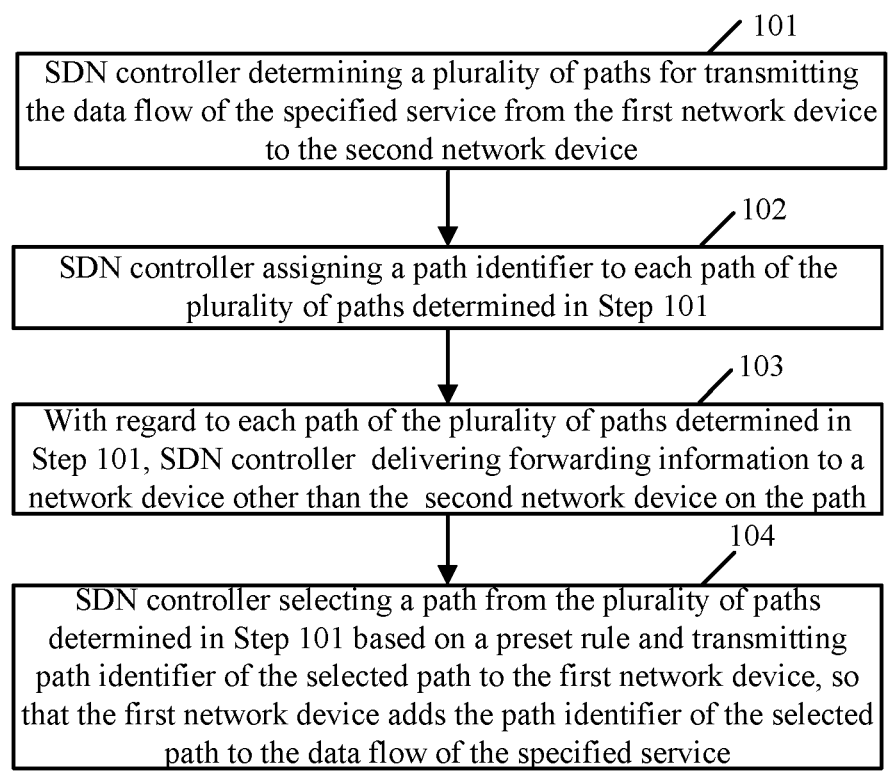
FIG. 1 is a flow chart of the method provided in the present disclosure.

Referring to FIG. 1, FIG. 1 is a flow chart of the method provided in the present disclosure, the flow being applicable for a SDN controller.

As shown in FIG. 1, the flow can include the following steps.

In a Step 101, the SDN controller determines a plurality of paths for transmitting a data stream of a specified service from a first network device to a second network device.

In the present disclosure, as an embodiment, the first network device and the second network device are starting and ending scheduling service objects determined by the SDN controller based on the network range of the specified service. Herein, the specified service can be various services of different types, such as a video service, an office service, and so on.

Figure 2:
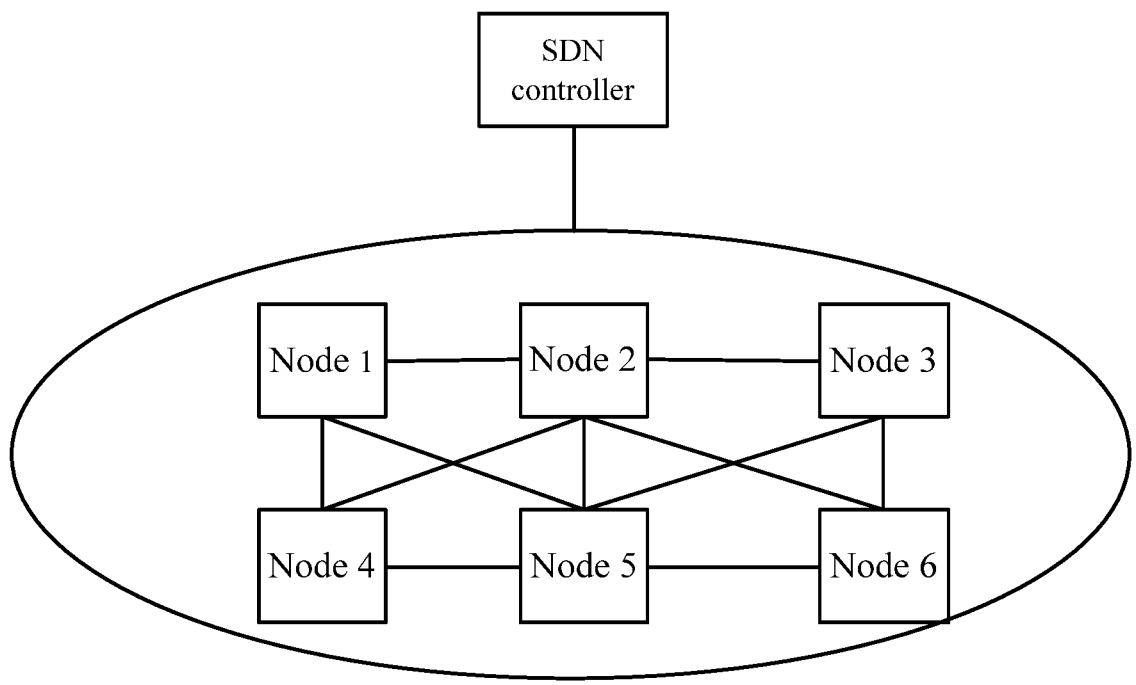
FIG. 2 is a schematic diagram of the applicable networking provided in the present disclosure.

As shown in FIG. 2, the network has 6 nodes ranging from node 1 to node 6. The network range of the video service can be from the node 1 to the node 3. Taking an example with the specified service being a video service, the SDN controller determines the node 1 and the node 3 as the starting and ending scheduling service objects for the scheduling of the video service according to the defined network range of the video service. Wherein, the node 1 is the starting scheduling service object, which is the afore-mentioned first network device, and the node 3 is the ending scheduling service object, which is the afore-mentioned second network device.

As an embodiment, the network range of the afore-mentioned specified service is defined based on the network topology in the networking. The network topology can be dynamically collected based on Border Gateway Protocol Link State (BGP-LS), or manually added by the user, which is not limited in the present disclosure.

Insofar as a plurality of paths are determined for transmitting the data stream of the specified service from the first network device to the second network device, in the present disclosure, other services between the first network device and the second network device can share the determined plurality of paths.

In the present disclosure, as an embodiment, both the path and the service can be distinguished by Differentiated Services Code Point (DSCP). However, the number of DSCP is limited. For example, only 62 values ranging from 1 to 47 and from 49 to 63 can be used. Thus, the number N of paths determined by Step 101 for transmitting the data stream of the specified service from the first network device to the second network device, and a number T of services between the first network device and the second network device may be limited. As an embodiment, the N is greater than 1 and is less than or equal to a preset maximum number M of paths, where M is a preset maximum number of paths from the first network device to the second network device, and T is greater than or equal to 1 and is less than or equal to a preset maximum number S of services, where S and M satisfy the condition: number of DSCP=S*(M+1).

Based on the above M, in the Step 101, determining a plurality of paths for transmitting a data stream of a specified service from a first network device to a second network device may include: calculating paths from the first network device to the second network device; if a number of the calculated paths is less than or equal to M, determining all the calculated paths as the plurality of paths for transmitting the data stream of the specified service from the first network device to the second network device; if the number of the calculated paths is greater than M, sorting the calculated paths according to path cost from low to high, and selecting from a resulted sequence the first M paths as the plurality of paths for transmitting the data stream of the specified service from the first network device to the second network device. The number of eventually determined paths for transmitting the data stream of the specified service from the first network device to the second network device does not exceed M.

In a Step 102, the SDN controller assigns to each path of the plurality of paths determined in the Step 101 a path identifier.

In the present disclosure, the path identifier assigned to each path is uniquely corresponding to the path and the specified service. Herein the path identifier is a DSCP value which will be described with examples in the subsequent paragraphs.

In a Step 103, with regard to each path of the plurality of paths determined in the Step 101, the SDN controller delivers forwarding information to a network device other than the second network device on the path.

In the present disclosure, the forwarding information is configured to instruct forwarding a data stream carrying the path identifier of the path to a next hop on the path of a network device receiving the forwarding information. The forwarding information carries at least the path identifier and the next hop on the path.

In a Step 104, the SDN controller selects a path from the plurality of paths determined in the Step 101 according to a preset rule, and transmits a path identifier of the selected path to the first network device, so that the first network device adds the path identifier of the selected path to the data stream of the specified service.

As discussed with respect to Step 103, a plurality of pieces of forwarding information can be stored in the first network device. Each of the plurality of pieces of forwarding information is corresponding to a path, and can be determined by the path identifier of the path. When the first network device receives the data stream of the specified service, it adds the path identifier notified by the SDN controller to the data stream of the specified service. As such, based on the path identifier, the first network device can forward the data stream to the next hop by the forwarding information corresponding to the path identifier. When the next hop receives the data stream, a corresponding forwarding information is selected according to the path identifier carried by the data stream and the data stream is forwarded accordingly, so that eventually the data stream of the specified service is forwarded along the path corresponding to the path identifier.

So far, the flow as shown in FIG. 1 is completed.

As can be seen from the flow shown in FIG. 1, in the present disclosure, before the first network device schedules the data stream of the specified service to the second network device, the SDN controller delivers in advance the forwarding information of each path for transmitting the data stream of the specified service to a network device other than the second network device on the path, which is equivalent to arranging all the paths for transmitting the data stream of the specified service between the first network device and the second network device in advance, and the operation of delivering forwarding information of an adjusted path can be omitted when subsequently the transmission path for the data stream of the specified service is subjected to adjustment, thereby improving the efficiency of path adjustment.

Further, in the present disclosure, the plurality of paths determined in the Step 101 for transmitting the data stream of the specified service from the first network device to the second network device are common paths and can be shared for services between any other two network devices, which could reduce path resource consumption.

As an embodiment, in the present disclosure, in order to ensure that the data stream of the specified service is always forwarded along an optimal path, in the present disclosure, the path selected for the data stream of the specified service (also referred to as the current path of the dataflow of the specified service) can be monitored in real time. Once the current path of the data stream of the specified service is detected to satisfy a path adjusting condition, the current path of the data stream of the specified service can be updated. Herein, the path adjusting condition to be satisfied includes: the path quality of the current path of the data stream of the specified service not satisfying a path constraint condition corresponding to the specified service, and/or the current path of the data stream of the specified service including a faulty link. Herein, the path constraint condition corresponding to the specified service is customized according to service demand, such as path delay, path packet loss rate, and path bandwidth, etc.

Specifically, when the SDN controller detects that the current path of the data stream of the specified service satisfies the path adjusting condition, it means that the current path of the data stream of the specified service is no longer suitable for continuing forwarding the data stream of the specified service, and is no longer the optimal path among the plurality of paths determined in the Step 101. On this basis, in order to ensure that the data stream of the specified service is always forwarded along the optimal path, the SDN controller reselects a path from the plurality of paths determined in the Step 101 according to a preset rule, and notifies the first network device of the path identifier of the reselected path, so that the first network device adds the path identifier of the reselected path to the data stream of the specified service. It indicates that the current path of the data stream of the specified service is changed to the reselected path, thereby realizing always forwarding the data stream of the specified service along an optimal path.

In the present disclosure, the SDN controller reselects a path from the plurality of paths determined in the Step 101 according to the preset rule and notifies the first network device of the reselected path, which is equivalent to a path adjustment of the data stream of the specified service. However, since forwarding information has been previously delivered to a network device other than the second network device on each path of the plurality of paths, the operation of delivering forwarding information of the reselected path can be omitted even if a path adjustment is performed, which greatly improves the efficiency of path adjustment.

The method provided in the present disclosure as shown in FIG. 1 is described with reference to the following embodiment.

Figure 3:
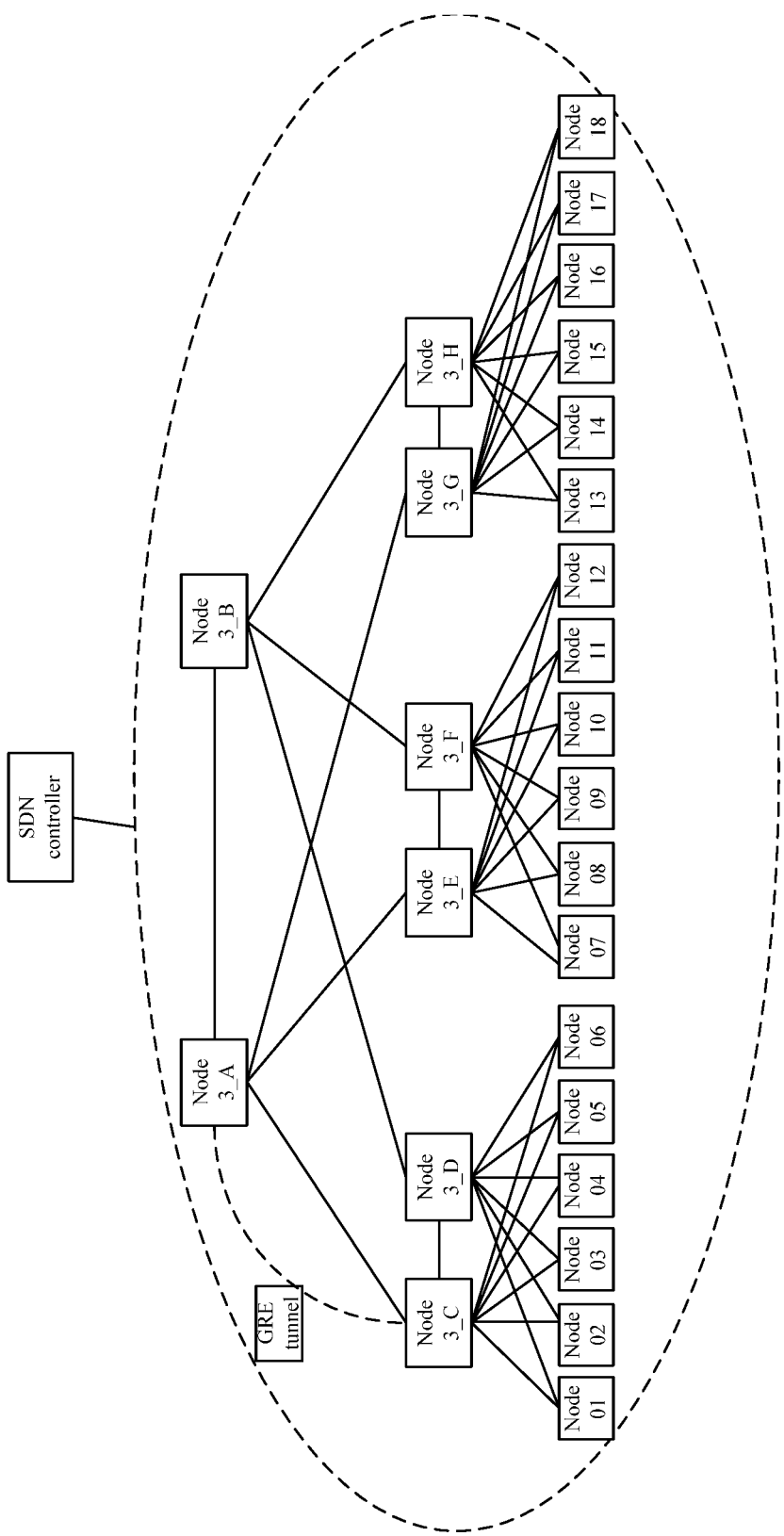
FIG. 3 is a diagram showing the industrial vertical networking applying the embodiments provided in the present disclosure.

Referring to FIG. 3, FIG. 3 is a diagram showing the industrial vertical networking applying the embodiments provided in the present disclosure. In the industrial vertical networking diagram illustrated in FIG. 3, it is assumed that a starting scheduling service object generated by the SDN controller according to a predefined service network range is the node 3_A shown in FIG. 3, and the ending scheduling service object is the node 3_C. The service network range in the industrial vertical networking can be defined according to a network topology based on the entire industrial vertical networking or according to a pre-configured network topology. Herein, the network topology includes: node information (vendor, version, and interface information, etc.), link information (including the connection relationship between nodes), link-allocable bandwidth, and dynamic link attributes such as delay, packet loss rate, real-time bandwidth, etc.

The SDN controller establishes a bidirectional tunnel between the node 3_A and the node 3_C. The tunnel source address of the bidirectional tunnel is a LoopBack interface address of the node 3_A. The tunnel destination address is the LoopBack interface address of the node 3_C. In this embodiment, the bidirectional tunnel established between the node 3_A and the node 3_C is a Generic Routing Encapsulation (GRE) tunnel. The tunnel source address of the GRE tunnel is the LoopBack interface address 1.1.1.1 of the node 3_A. The tunnel destination address is the LoopBack interface address 1.1.1.3 of the node 3_C. It should be noted that if a GRE tunnel has been established between the node 3_A and the node 3_C, this step can be omitted.

As an embodiment, in order to ensure that all services from the node 3_A to the node 3_C are preferentially forwarded through the GRE tunnel, after the GRE tunnel is established between the node 3_A and the node 3_C, the node 3_C can issue the local private network route to the GRE tunnel through Border Gateway Protocol (BGP), so that all services from the node 3_A to the node 3_C are preferentially forwarded through the GRE tunnel.

If the SDN controller detects that the path from the node 3_A to the node 3_C has not been planned, it will determine a path for transmission from the node 3_A to the node 3_C. Scheduling paths are determined such that to a greatest extent, the determined paths are not repeated, the path cost reaches the lowest, and the number of paths is smaller than the preset maximum number M of paths. As an embodiment, the value of M is 5 herein.

Based on the networking as shown in FIG. 3, it is assumed that the SDN controller determines the following paths for the transmission from the node 3_A to the node 3_C:

Path 1: node 3_A->node 3_C, of which the cost is 1 and the number of hop is 1;

Path 2: node 3_A->node 3_B->node 3_D->node 3_C, of which the cost is 3 and the number of hop is 3;

Path 3: node 3_A->node 3_E->node 3_F->node 3_B->node 3_D->node 3_C, of which the cost is 5 and the number of hop is 5.

When the SDN controller determines the paths for transmission from the node 3_A to the node 3_C, with regard to each path, the SDN controller determines DSCP for applying each service between the node 3_A and the node 3_C to the path.

Assuming that the number of services existing between the node 3_A and the node 3_C is 5 (smaller than the preset maximal number S of service), a DSCP plan for the 5 services and the above determined paths for transmission from the node 3_A to the node 3_C is shown in Table 1.

TABLE 1

| Service | Service identifier | DSCP | | |
|---------|--------------------|------|---|---|
|         |                    | Path 1 | Path 2 | Path 3 |
| Service 1 | 1 | 2 | 3 | 4 |
| Service 2 | 5 | 6 | 7 | 8 |
| Service 3 | 9 | 10 | 11 | 12 |
| Service 4 | 13 | 14 | 15 | 16 |
| Service 5 | 17 | 18 | 19 | 20 |

The numbers in Table 1 are described with examples. Taking the number "1" as an example, in Table 1, the number "1" is a value in DSCP resource, and is expressed as the identifier of the Service 1. Taking the number "2" as an example, in Table 1, the number "2" is a value in DSCP resource, which corresponds to both the Service 1 and the Path 1, and is specifically the path identifier for applying the Service 1 to the Path 1. The other figures in Table 1 have similar meanings and will not be exemplified one by one.

Taking the Service 1 in Table 1 as an example, the rest services being similar, the SDN controller delivers, with regard to each path, forwarding information to nodes other than the node 3_C on the path.

Taking the Path 1 as an example, since the Path 1 as described is: node 3_A->node 3_C, the SDN controller delivers the forwarding information of the Path 1 to the node 3_A. The node 3_A is the first hop node of the Path 1. As an embodiment, the forwarding information delivered by the SDN controller to the node 3_A can be a global Policy-Based Routing (PBR), and specifically includes: the source address and the destination address of the GRE tunnel, the identifier (2 in DSCP) of the Path 1 corresponding to the Service 1, and the next hop (the node 3_C).

Taking the Path 2 as an example, since the Path 2 as described is: node 3_A->node 3_B->node 3_D->node 3_C, the SDN controller delivers the forwarding information of the Path 2 to the node 3_A, the node 3_B, and the node 3_D. The node 3_A is the first hop node of the Path 2. As an embodiment, the forwarding information delivered by the SDN controller to the node 3_A can be a global PBR, and specifically includes: the source address and the destination address of the GRE tunnel, the identifier (3 in DSCP) of the Path 2 of corresponding to the Service 1, and the next hop (the node 3_B). The node 3_B is a non-first hop node on Path 2. As an embodiment, the forwarding information delivered by the SDN controller to the node 3_B can be a PBR based on the inbound interface, and specifically includes: the source address and the destination address of the GRE tunnel, the identifier (3 in DSCP) of the Path 2 corresponding to the Service 1, and the next hop (node 3_D). The node 3_D is also a non-first hop node on the Path 2. As an embodiment, the forwarding information delivered by the SDN controller to the node 3_D can be a PBR based on the inbound interface, and specifically includes: the source address and the destination address of the GRE tunnel, the identifier (3 in DSCP) of the Path 2 corresponding to the Service 1, and the next hop (node 3_C). The case where the path is the Path 3 is similar, which will not be described repeatedly.

It should be noted that, if the SDN controller detects that a scheduling path has been planned between the node 3_A and the node 3_C, the above steps of determining the scheduling path and delivering the forwarding information can be omitted.

Taking the Service 1 shown in Table 1 as an example, the SDN controller selects an optimal path from the three paths of the Path 1, the Path 2, and the Path 3. The term "optimal" used herein refers to having optimal path parameters such as path quality, path bandwidth, and path cost.

Assuming that the SDN controller selects the Path 1 as the optimal path, the SDN controller delivers a notification message (denoted as message a) to node 3_A. The message a carries DSCP of the Path 1 selected for the Service 1, which is 2, to indicate that the Service 1 selects the Path 1 as the available service path.

The node 3_A receives the message a sent by the SDN controller, and stores the DSCP carried by the message a, which is 2.

When the node 3_A subsequently receives the data stream of the Service 1 and identifies the receive data stream as the data stream of the Service 1, the node 3_A encapsulates a GRE tunnel header in the data stream. In the GRE tunnel header, the tunnel source address field is the source address of the GRE tunnel; the tunnel destination address field is the destination address of the GRE tunnel. The DSCP field in the GRE tunnel header is the DSCP carried by the above message a, which is 2. As an embodiment, the node 3_A identifying that the received data stream is the data stream of the Service 1 specifically includes: identifying original features of the data stream, such as the port number corresponding to the service, and finding from a predefined corresponding relation between the original features of the dataflow and the service a corresponding relation including the identified original feature. If the service identifier for the Service 1 is found in the corresponding relation, it can be determined that the data stream received is the data stream of the Service 1.

The node 3_A forwards the data stream encapsulating the GRE tunnel header through the path corresponding to the DSCP of 2, i.e., the Path 1.

The node 3_C receives the data stream and de-encapsulates the GRE tunnel header for the data stream according to the tunnel source and destination addresses in the GRE tunnel header and forwards the data stream.

In actual applications, even if the Path 1 is optimal when it is selected as the available service path of the Service 1, the link quality of the Path 1 would change along with an increase of the data stream transmitted by the Path 1. In light of this, in the present disclosure, the SDN controller monitors the link quality of the Path 1 in real time. Once the link quality of the Path 1 is detected to be inferior and satisfies the path adjusting condition, where the path adjusting condition is the same as described above, an optimal path is reselected based on the link quality of the current scheduling paths, i.e., the Path 1, the Path 2, and the Path 3.

If the SDN controller selects Path 2 as optimal, the SDN controller delivers a notification message (denoted as message b) to the node 3_A. The message b carries the DSCP which is 3 of the Path 2 selected for the Service 1 to indicate that the Path 1 previously selected for the Service 1 needs to be updated to the Path 2. Under the precondition that the SDN controller has delivered in advance the forwarding information of all the paths applied by the Service 1, even if path adjustment is performed, the SDN controller only needs to notify the node 3_A to update the Path 1 previously selected for the Service 1 to the Path 2, and the operation of delivering the forwarding information of the Path 2 can be omitted, which greatly improves the efficiency of path adjustment.

The node 3_A receives the message b sent by the SDN controller, and stores the DSCP carried by the message b, which is 3.

When subsequently the node 3_A receives the data stream of the Service 1 and identifies the received data stream as the data stream of the Service 1, the node 3_A encapsulates a GRE tunnel header in the data stream. In the GRE tunnel header, the tunnel source address field is the source address of the GRE tunnel; the tunnel destination address field is the destination address of the GRE tunnel. The DSCP field in the GRE tunnel header is the DSCP carried by the message b, which is 3.

The node 3_A forwards the data stream encapsulating the GRE tunnel header through the path corresponding to the DSCP of 3, i.e. the Path 2.

The node 3_B receives the data stream, and identifies the DSCP field in the GRE tunnel header of the data stream to find the DSCP to be 3. The node 3_B then searches forwarding information containing the DSCP being 3 from all forwarding information that has been received before, and forwards the data stream via the next hop in the forwarding information.

The node 3_D is similar to the node 3_B. When it receives the data stream, the node 3_D identifies the DSCP field in the GRE tunnel header of the data stream to finds that the DSCP to be 3. The node 3_D then searches forwarding information containing the DSCP being 3 from all forwarding information that has been received before, and forwards the data stream via the next hop in the forwarding information.

The node 3_C receives the data stream, de-encapsulates the GRE tunnel header according to the tunnel source and destination addresses in the GRE tunnel header of the data stream, and forwards the data stream.

It should be noted that, in this embodiment, when the SDN controller selects a path for the service 1, in order to facilitate the collection of the traffic of the Service 1, it can specify a collection egress port on the path selected for the Service 1 and deliver a traffic collection policy (the matching rule being the GRE tunnel source address, the GRE tunnel destination address, and DSCP) to the specified collection egress port. Traffic of the Service 1 is collected at the specified collection egress port as a basis for traffic scheduling. As an embodiment, the specified collection egress port can be: an egress port for forwarding the data stream of the Service 1 of each node other than the node 3_C on the path selected for the Service 1.

The embodiments provided in the present disclosure are described above.

It should be noted that, as an embodiment, after determining the plurality of paths for transmitting the data stream of the specified service from the first network device to the second network device, the SDN controller can record the determined plurality of paths to a path planning list.

The SDN controller monitors the path optimization condition in real time. Herein, in an implementation, the path optimization condition can be a change in the network topology, for example, a link being newly added or a link becoming faulty which causes a change of the previously determined paths for transmitting the data stream of the specified service from the first network device to the second network device.

Figure 4:
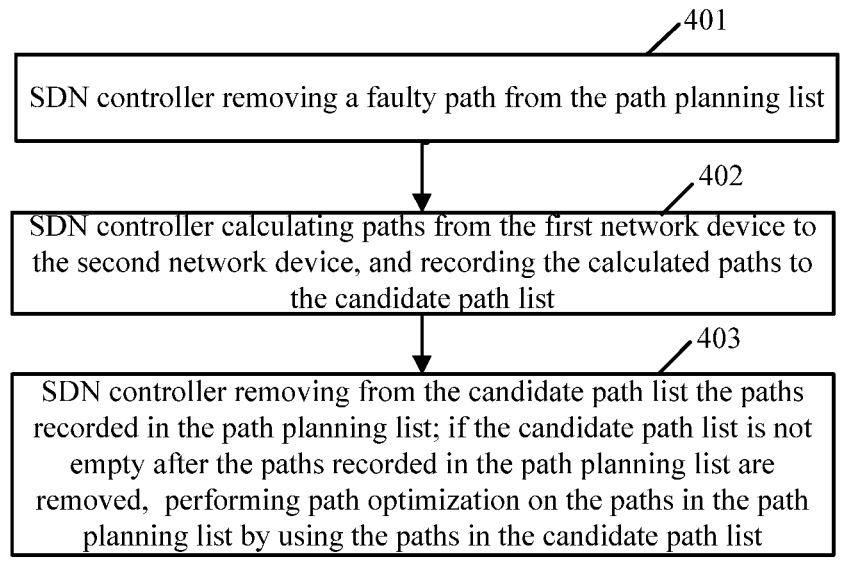
FIG. 4 is a flow chart of the path optimization provided in the present disclosure.

When the SDN monitors that the path optimization condition is satisfied, it performs path optimization on the paths recorded in the path planning list. As an embodiment, the path optimization herein includes at least: adding a path to the path planning list or removing a path from the path planning list. FIG. 4 specifically shows how to optimize the scheduling path in the path planning list.

Referring to FIG. 4, FIG. 4 is a flow chart of the path optimization provided in the present disclosure. As shown in FIG. 4, the flow can include the following steps.

In a Step 401, the SDN controller removes a faulty path from the path planning list.

In a Step 402, the SDN controller calculates paths from the first network device to the second network device and records the calculated paths to the candidate path list.

As an embodiment, if the number of the calculated paths is less than or equal to M, the SDN controller records all of the calculated paths as candidate scheduling paths to the candidate path list. If the number of the calculated paths is greater than M, the SDN controller sorts the calculated paths according to the path cost from low to high, and selects from the resulted sequence the first M paths as the candidate scheduling paths to be recorded in the candidate path list. The number of the paths eventually recorded in the candidate path list does not exceed M.

In a Step 403, the SDN controller removes the path recorded in the path planning list from the candidate path list. If the candidate path list is not empty after the paths recorded in the path planning list are removed, the SDN controller performs path optimization on the paths in the path planning list by using the paths in the candidate path list.

Specifically, the method for performing path optimization on the paths in the path planning list by using the paths in the candidate path list includes:

Step a1, comparing the number K of paths in the candidate path list to H which is the difference between M and the number L of paths in the path planning list; if K is less than or equal to H, performing Step a2; if K is greater than H, performing Step a3;

Step a2, adding all the paths in the candidate path list to the path planning list, and ending the path optimization;

Step a3, extracting H paths from the candidate path list according to the path cost from low to high, adding the extracted paths to the path planning list, removing the H paths from the candidate path list, and replacing the second specified path in the path planning list with the first specified path in the candidate path list after the H paths are removed, where the path cost of the first specified path is smaller than the path cost of the second specified path.

As an embodiment, herein, replacing the second specified path in the path planning list with the first specified path in the candidate path list after the H paths are removed includes:

comparing the path with the lowest path cost in the candidate path list to the path with the highest path cost in the path planning list;

if the path cost of the former is greater than the path cost of the latter, ending the path optimization;

if the path cost of the former is smaller than the path cost of the latter, replacing the path with the highest path cost in the path planning list with the path with the lowest path cost in the candidate path list, and removing the path with the lowest path cost from the candidate path list; if the candidate path list is not empty after the path with the lowest path cost is removed, returning to the step of comparing the path with the lowest path cost in the candidate path list to the path with the highest path cost in the path planning list.

So far, the flow shown in FIG. 4 is completed.

The optimization of the scheduling path is completed by performing the steps 401 to 403 in the flow shown in FIG. 4.

Eventually, the following changes are made in the paths recorded in the path planning list as compared to the paths recorded before the optimization:

Optimized scheduling paths (denoted as the first type of scheduling path) are added to the path planning list;

Scheduling paths originally recorded in the path planning list (denoted as the second type of scheduling path) are removed due to the optimization.

Corresponding solutions for the above two types of scheduling paths are further provided in the present disclosure. Specifically, For the first type of scheduling path, forwarding information is delivered to a network device other than the second network device on the first type of scheduling path to ensure that the first type of scheduling path forwards the specified service normally and in time.

For the second type of scheduling path, a network device other than the second network device on the second type of scheduling path is notified to remove the forwarding information of the second type of scheduling path, so that each scheduling object remove redundant forwarding information in time. As an embodiment, in the present disclosure, first the forwarding information is delivered to a network device other than the second network device on the first type of scheduling path; and then the network device other than the second network device on the second type of scheduling path is notified to remove the forwarding information of the second type of scheduling path, thereby intending to prevent data stream transmission from being interrupted.

So far, the description of the method provided by the present disclosure has been completed.

The device provided in the present disclosure is described in the subsequent paragraphs.

Figure 5:
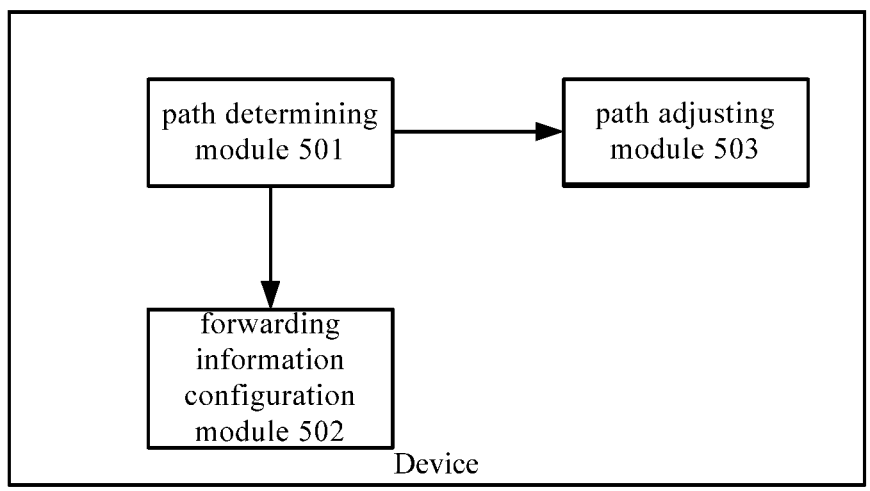
FIG. 5 is a structure diagram of the device provided in the present disclosure.

Referring to FIG. 5, FIG. 5 is a structure diagram of the device provided in the present disclosure. The device is applied to a SDN controller, comprising:

a path determining module 501 for determining a plurality of paths for transmitting a data stream of a specified service from a first network device to a second network device;

a forwarding information configuration module 502 for assigning a path identifier for each path of the plurality of paths, and, with regard to each path of the plurality of paths, delivering the forwarding information to a network device other than the second network device on the path, where the path identifier assigned to each path is uniquely corresponding to the path and the specified service, the forwarding information is configured to instruct forwarding a data stream carrying a path identifier of the path to a next hop on the path of the network device receiving the forwarding information; and a path adjusting module 503 for selecting a path from the plurality of paths according to a preset rule, and transmitting the path identifier of the selected path to the first network device, so that the first network device adds the path identifier of the selected path to the data stream of the specified service.

As an embodiment, the path determining module 501 determining a plurality of paths for transmitting a data stream of a specified service from a first network device to a second network device includes:

calculating paths from the first network device to the second network device;

if a number of the calculated paths is less than or equal to M, determining all the calculated paths as the plurality of paths for transmitting the data stream of the specified service from the first network device to the second network device;

if the number of the calculated paths is greater than M, sorting the calculated paths according to path cost from low to high, and selecting from a resulted sequence the first M paths as the plurality of paths for transmitting the data stream of the specified service from the first network device to the second network device;

where M is a maximum number of paths from the first network device to the second network device.

As an embodiment, when the path adjusting module 503 further detects that the selected path satisfies a path adjusting condition, the path adjusting module 503 reselects a path from the plurality of paths according to a preset rule and notifies the first network device of a path identifier of the reselected path, so that the first network device adds the path identifier of the reselected path to the data stream of the specified service;

where the path adjusting condition includes: path quality not satisfying a path constraint condition corresponding to the specified service, and/or the path containing a faulty link.

As an embodiment, the path determining module 501 further records the plurality of paths to a path planning list.

When a path optimizing condition is satisfied, the path adjusting module 503 performs path optimization on paths recorded in the path planning list, the path optimization at least including adding a path to the path planning list or removing a path from the path planning list; with regard to each path added to the path planning list, forwarding information is delivered to a network device other than the second network device on the path.

The path optimization performed by the path adjusting module 503 on the paths recorded in the path planning list includes:

removing a faulty path from the path planning list;

calculating paths from the first network device to the second network device, recording the calculated paths to a candidate path list, and removing from the candidate path list paths recorded in the path planning list; and if the candidate path list is not empty after the paths recorded in the path planning list are removed, performing path optimization on the paths in the path planning list by using paths in the candidate path list.

As an embodiment, the path adjusting module 503 performing path optimization on the paths in the path planning list by using paths in the candidate path list includes:

if a number K of paths in the candidate path list is less than or equal to H which is a difference between M and a number L of the paths in the path planning list, adding all the paths in the candidate path list to the path planning list; and if the K is greater than the H, extracting H paths from the candidate path list according to path cost from low to high, adding the H paths to the path planning list, removing the H paths from the candidate path list, and replacing a second specified path in the path planning list with a first specified path in the candidate path list with the H paths removed, where a path cost of the first specified path is smaller than a path cost of the second specified path.

So far, the structure diagram of the device provided in the present disclosure is described.

Figure 6:
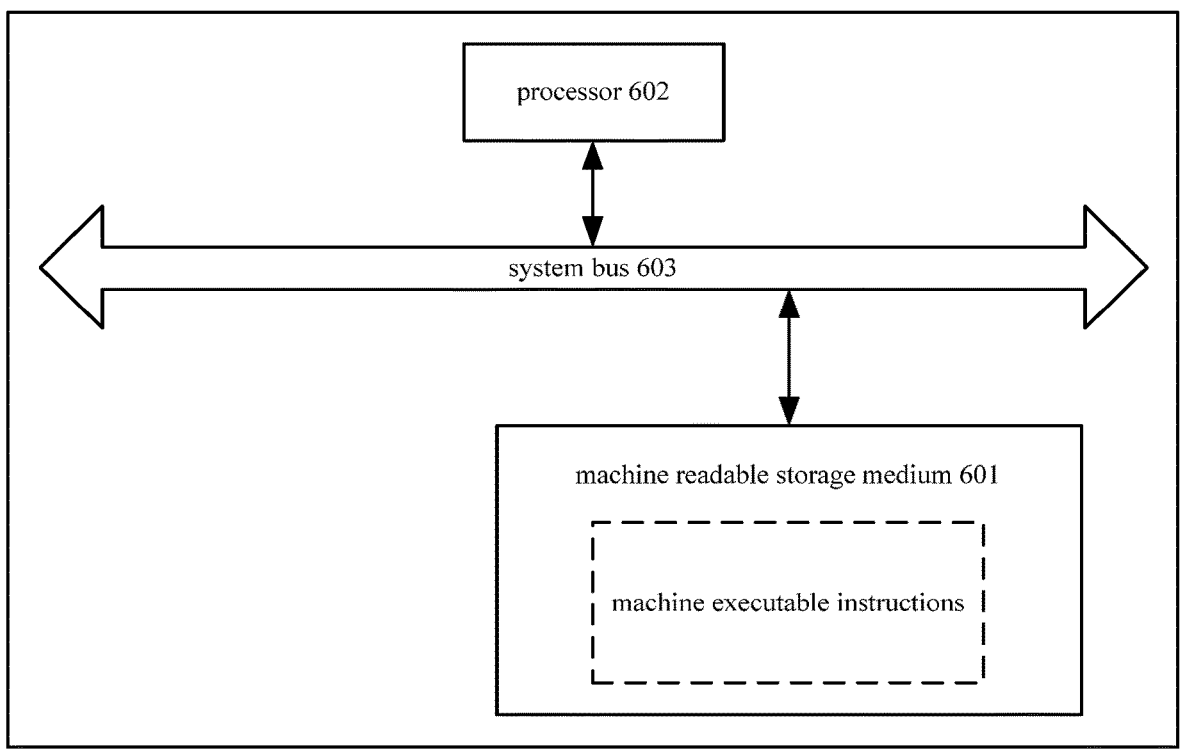
FIG. 6 is a structure diagram of the hardware of the device provided in the present disclosure as shown in FIG. 5.

Correspondingly, there is further provided in the present disclosure a hardware structure diagram corresponding to the device shown in FIG. 5. As shown in FIG. 6, the device can include: a machine readable storage medium 601 and a processor 602, wherein the machine readable storage medium 601 and the processor 602 are capable of communicating via a system bus 603.

The machine readable storage medium 601 is configured to store the machine executable instructions corresponding to the operations to be performed by the path determining module 501, the forwarding information configuration module 502, and the path adjusting module 503.

The processor 602 is configured to load and execute the machine executable instructions to implement the service scheduling method as described in the foregoing paragraphs.

As an example, machine readable storage medium 601 can be any electronic, magnetic, optical, or other physical storage device that can contain or store information such as executable instructions, data, and the like. For example, the machine readable storage medium can be a Random Access Memory (RAM), a volatile memory, a non-volatile memory, a flash memory, a storage drive (e.g., a hard drive), a solid state drive, any type of storage disk (e.g., compact disc, DVD, etc.), or a similar storage medium, or a combination thereof.

So far, the hardware structure shown in FIG. 6 is described.

The foregoing is merely preferred embodiments of the present disclosure, and is not intended to limit the present disclosure. Any modification, equivalent, improvement, and the like, which are made within the spirit and principles of the present disclosure, should be included in the protection scope of the present disclosure.

What is claimed is:

1. A method for data stream transmission, comprising:
    determining, by a Software Defined Network controller, a plurality of paths for transmitting a data stream of a specified service from a first network device to a second network device;
    assigning, by the SDN controller, to each path of the plurality of paths a path identifier, where the path identifier assigned to each path is uniquely corresponding to the path and the specified service;
    with regard to each path of the plurality of paths, delivering, by the SDN controller, forwarding information to a network device other than the second network device on the path, where the forwarding information is configured to instruct forwarding a data stream carrying the path identifier of the path to a next hop on the path of a network device receiving the forwarding information; and
    selecting, by the SDN controller, a path from the plurality of paths based on a preset rule, and transmitting, by the SDN controller, a path identifier of the selected path to the first network device, so that the first network device adds the path identifier of the selected path to the data stream of the specified service.

2. The method according to claim 1, wherein the determining, by the SDN controller, a plurality of paths for transmitting a data stream of a specified service from a first network device to a second network device comprises:
    calculating, by the SDN controller, paths from the first network device to the second network device;
    when a number of the calculated paths is less than or equal to M, determining, by the SDN controller, all the calculated paths as the plurality of paths for transmitting the data stream of the specified service from the first network device to the second network device, wherein, M is a positive integer; and
    when the number of the calculated paths is greater than M, sorting, by the SDN controller, the calculated paths based on path cost from low to high, and selecting, by the SDN controller, from a resulted sequence first M paths as the plurality of paths for transmitting the data stream of the specified service from the first network device to the second network device,
    where M is a maximum number of paths from the first network device to the second network device.

3. The method according to claim 1, further comprising:
    in a case where the selected path is detected to satisfy a path adjusting condition, reselecting, by the SDN controller, a path from the plurality of paths based on a preset rule, and notifying, by the SDN controller, the first network device of a path identifier of the reselected path, so that the first network device adds the path identifier of the reselected path to the data stream of the specified service,
    where the path adjusting condition includes: path quality not satisfying a path constraint condition corresponding to the specified service, and/or the path containing a faulty link.

4. The method according to claim 1, further comprising:
    recording, by the SDN controller, the plurality of paths to a path planning list;
    when a path optimizing condition is satisfied, performing, by the SDN controller, path optimization on paths recorded in the path planning list, the path optimization at least including adding a path to the path planning list or removing a path from the path planning list; and
    with regard to each path added to the path planning list, delivering, by the SDN controller, forwarding information to a network device other than the second network device on the path.

5. The method according to claim 4, wherein the performing, by the SDN controller, path optimization on paths recorded in the path planning list comprises:
    removing, by the SDN controller, a faulty path from the path planning list;

calculating, by the SDN controller, paths from the first network device to the second network device, recording, by the SDN controller, the calculated paths to a candidate path list, and removing, by the SDN controller, from the candidate path list paths recorded in the path planning list; and when the candidate path list is not empty after the paths recorded in the path planning list are removed, performing, by the SDN controller, the path optimization on the paths in the path planning list by using paths in the candidate path list.

6. The method according to claim 5, wherein the performing, by the SDN controller, the path optimization on the paths in the path planning list by using paths in the candidate path list comprises:

when a number K of paths in the candidate path list is less than or equal to H which is a difference between M and a number L of paths in the path planning list, adding, by the SDN controller, all the paths in the candidate path list to the path planning list, wherein, H, K, L, and M are positive integers; and when the K is greater than the H, extracting, by the SDN controller, H paths from the candidate path list based on path cost from low to high, adding, by the SDN controller, the H paths to the path planning list, removing, by the SDN controller, the H paths from the candidate path list, and replacing, by the SDN controller, a second specified path in the path planning list with a first specified path in the candidate path list with the H paths removed, where a path cost of the first specified path is smaller than a path cost of the second specified path, where M is a maximum number of paths from the first network device to the second network device.

7. The method according to claim 1, wherein the path identifier is a DSCP value.

8. A Software Defined Network controller, comprising:
a processor, and
a machine readable storage medium storing machine executable instructions which, when read and executed by the processor, cause the processor to:
determine a plurality of paths for transmitting a data stream of a specified service from a first network device to a second network device;
assign to each path of the plurality of paths a path identifier, where the path identifier assigned to each path is uniquely corresponding to the path and the specified service;
with regard to each path of the plurality of paths, deliver forwarding information to a network device other than the second network device on the path, where the forwarding information is configured to instruct forwarding a data stream carrying the path identifier of the path to a next hop on the path of a network device receiving the forwarding information; and
select a path from the plurality of paths based on a preset rule, and transmit a path identifier of the selected path to the first network device, so that the first network device adds the path identifier of the selected path to the data stream of the specified service.

9. The SDN controller according to claim 8, wherein the determining a plurality of paths for transmitting a data stream of a specified service from a first network device to a second network device comprises:
calculating paths from the first network device to the second network device;

when a number of the calculated paths is less than or equal to M, determining all the calculated paths as the plurality of paths for transmitting the data stream of the specified service from the first network device to the second network device, wherein, M is a positive integer; and when the number of the calculated paths is greater than M, sorting the calculated paths based on path cost from low to high, and selecting from a resulted sequence the first M paths as the plurality of paths for transmitting the data stream of the specified service from the first network device to the second network device, where M is a maximum number of paths from the first network device to the second network device.

10. The SDN controller according to claim 8, wherein the machine executable instructions further cause the processor to:

in a case where the selected path is detected to satisfy a path adjusting condition, reselect a path from the plurality of paths based on a preset rule, and notify the first network device of a path identifier of the reselected path, so that the first network device adds the path identifier of the reselected path to the data stream of the specified service, where the path adjusting condition includes: path quality not satisfying a path constraint condition corresponding to the specified service, and/or the path containing a faulty link.

11. The SDN controller according to claim 8, wherein the machine executable instructions further cause the processor to:

record the plurality of paths to a path planning list;

when a path optimizing condition is satisfied, perform path optimization on paths recorded in the path planning list, the path optimization at least including adding a path to the path planning list or removing a path from the path planning list; and with regard to each path added to the path planning list, deliver forwarding information to a network device other than the second network device on the path.

12. The SDN controller according to claim 11, wherein the performing path optimization on paths recorded in the path planning list comprises:
removing a faulty path from the path planning list;
calculating paths from the first network device to the second network device, recording the calculated paths to a candidate path list, and removing from the candidate path list paths recorded in the path planning list; and when the candidate path list is not empty after the paths recorded in the path planning list are removed, performing path optimization on the paths in the path planning list by using paths in the candidate path list.

13. The SDN controller according to claim 12, wherein the performing path optimization on the paths in the path planning list by using paths in the candidate path list comprises:

when a number K of paths in the candidate path list is less than or equal to H which is a difference between M and a number L of the paths in the path planning list, adding all the paths in the candidate path list to the path planning list, wherein, H, K, L, and M are positive integers; and when the K is greater than the H, extracting H paths from the candidate path list based on path cost from low to high, adding the H paths to the path planning list, removing the H paths from the candidate path list, and replacing a second specified path in the path planning list with a first specified path in the candidate path list with the H paths removed, where a path cost of the first specified path is smaller than a path cost of the second specified path, where M is a maximum number of paths from the first network device to the second network device.

14. The SDN controller according to claim 8, wherein the path identifier is a DSCP value.

15. A non-transitory machine readable storage medium storing instructions which, when executed by a machine, cause the machine to perform operations of:

determining a plurality of paths for transmitting a data stream of a specified service from a first network device to a second network device;

assigning to each path of the plurality of paths a path identifier, where the path identifier assigned to each path is uniquely corresponding to the path and the specified service;

with regard to each path of the plurality of paths, delivering forwarding information to a network device other than the second network device on the path, where the forwarding information is configured to instruct forwarding a data stream carrying the path identifier of the path to a next hop on the path of a network device receiving the forwarding information; and selecting a path from the plurality of paths based on a preset rule, and transmitting a path identifier of the selected path to the first network device, so that the first network device adds the path identifier of the selected path to the data stream of the specified service.

\* \* \* \* \*